May 17, 1966  R. M. JOHNSON  3,251,721
TIRE REPAIR PROCESS
Filed April 27, 1962

INVENTOR,
Robert M. Johnson
BY
S. J. Rotondi & A. J. Dupont

United States Patent Office 3,251,721
Patented May 17, 1966

3,251,721
TIRE REPAIR PROCESS
Robert M. Johnson, New York, N.Y.
(Red River Ordnance Depot, Texarkana, Tex.)
Filed Apr. 27, 1962, Ser. No. 190,837
1 Claim. (Cl. 156—97)

The invention described herein may be manufactured and used by or for the Government for governmental purposes without the payment to me of any royalty thereon.

This invention relates to a novel method of repairing tires and more particularly to a sectional tire repair whereby fabric is restored to a skived cavity in the tire casing.

The standard method of repairing tires that are pierced by a blowout or puncture, is to skive the cavity made by the injury to form an hourglass cross section, then fill the inner portion of the cavity with a cushion material and cover with a patch. The outer portion of the cavity, that which comes in contact with the road surface, is then filled with rubber and the repair is vulcanized with heat and pressure.

Another method presently being used utilizes a preformed patch made by crossing, at right angles, a number of rubberized fabric strips of increasing width which directly overlap each other. The disadvantage of this method is the short life of the repair. The cross patches create a stress on the tire and pull at the corners of the patch, especially as the tire pressure changes. These stresses cause a "winging" at the corners where the patches lift up and the repair is weakened.

Still another method was devised which distributed the stress more evenly around the circumference of the puncture. The method employs the preformed rosette patch. This patch consists of a rosette of strips encased in a disc of rubber. First the inner cavity is filled and then covered with the patch. The basic fault with this method lies in the fact that the cavity had originally contained cord which was replaced by relatively weak cushioning with the cord being displaced below it. This resulted in a thickening of the tire wall and a resultant increase in weight at its weakest point.

Preformed patches, while providing faster repair, create a stockage problem. A large number of patches must be kept in stock for different size repairs. Also, due to the limited shelf life of preformed patches, many are wasted annually due to deterioration. This is especially true of the odd sized group.

The present invention is designed to overcome the aforesaid disadvantages by providing a tire repair method that not only restores the cord to its proper position within the cavity in the tire, but also eliminates the aforesaid stockage problem as well.

Briefly, the present invention comprises the method of using a plurality of pairs of strips of cord embedded in rubber, the pairs of strips progressively increasing in width to conform to and fit into the hourglass shaped cavity of a tire, and of placing filler discs of rubber between the pairs of strips.

It is, therefore, an object of this invention to provide an improved method of applying a repair to a tire.

Another object is to restore a damaged tire to more nearly its original condition.

A further object is to replace the cord in an injured tire to approximately its original position in the tire.

A still further object is to solve the stockage and waste problem in tire repair by fitting the patch to the individual injury from a single stock item.

The specific nature of the invention as well as other objects and advantages thereof will clearly appear from a description of a preferred embodiment as shown in the drawing, in which.

Figure 2:
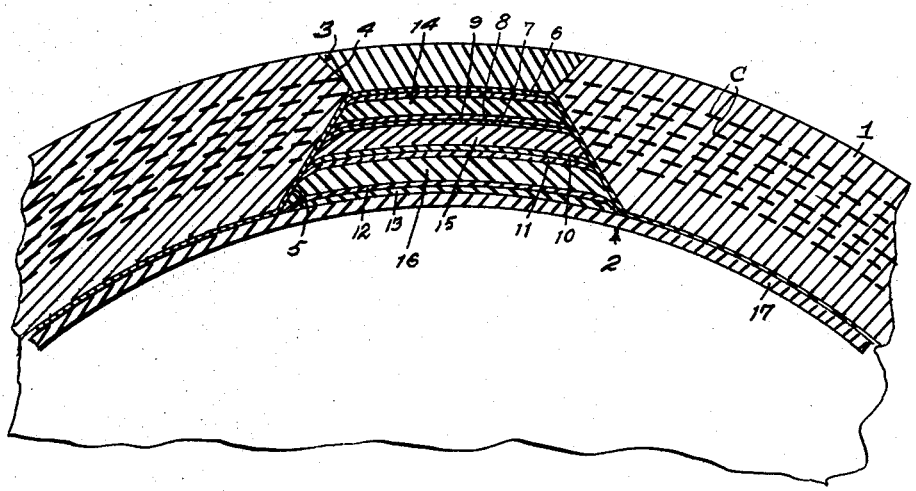
FIG. 2 is an enlarged cross section view taken along lines 2—2 of FIG. 1 and looking in the direction of the arrows.
Figure 3:
FIG. 3 is a perspective view of a filler disc used in the repair.
Figure 4:
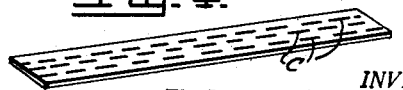
FIG. 4 is a perspective view of one of the cord strips used in this invention.

Referring to the drawing in detail, 1 represents a tire casing having cord C imbedded therein, the cord being shown in FIG. 2.

The tire repair of the invention is represented generally by 2.

The tire injury area is represented generally by 3 and it is shown as being skived around its outer and inner edges to form beveled edges 4 and 5 which results in an hourglass shaped cavity as seen in FIG. 2.

Adhesive is then applied to the skived edges of cavity 3 and along an area of about four inches of the inside surface of the tire surrounding the cavity 3.

A first strip 6 of cord is placed within the inner portion of cavity 3 and adjacent the smallest diameter of cavity 3 as shown in FIG. 2 and is extended between three or four inches along either side of cavity 3 over the inside surface of the tire 1.

A second strip 7 is then applied by adhesive over strip 6 and at a right angle thereto. This strip is also extended to the same distance as strip 6 along the inside of the tire.

A filler disc 14 of vulcanizable rubber is then laid over the strips 6 and 7. The process is repeated, using strips 8, 9, 10, 11, 12, 13 and filler discs 15 and 16, until the inner portion of cavity 3 is substantailly filled as shown in FIG. 2. As many crossed strips and filler discs can be used as is needed depending upon the thickness of the tire casing and the ply. Four pairs of strips are shown in FIG. 1.

After the strips and filler discs are in place, they are anchored by placing a rubber disc 17 over the entire repair. This disc 17 is secured therein by an adhesive to the repair 2.

The outer portion of the skived cavity 3 is then filled with rubber and the entire repair, inner and outer portions, are vulcanized together as the final step, vulcanization being a well known method.

Figure 1:
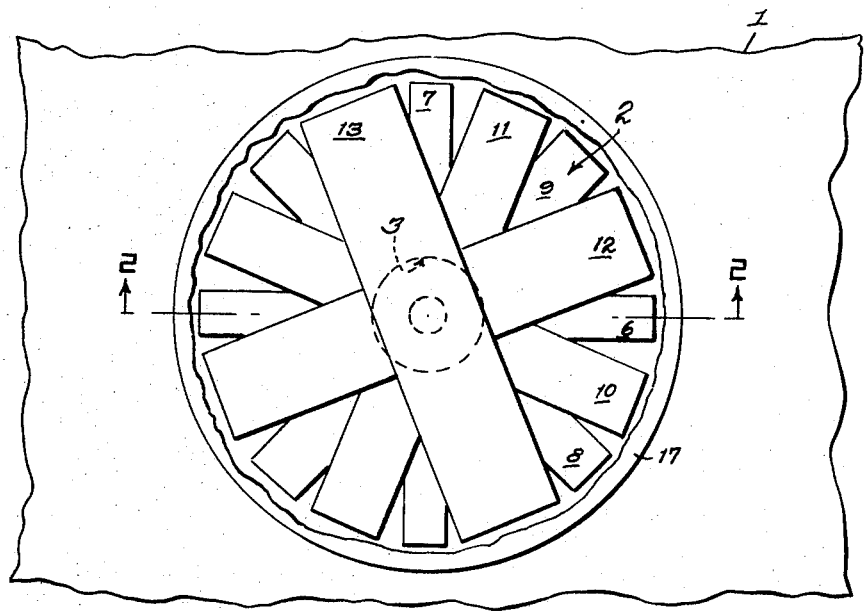
FIG. 1 is an elevation view, looking at the inside of a tire casing, and showing the repair patch of the invention.

From observing the repair in FIG. 1 it will be seen that each strip and each filler disc is approximately the same width as the area it covers.

The resultant repair blends the strips and discs smoothly into the rest of the tire.

The strips 6–13 may, for convenience, be cut from a single roll about 18" long and the strips, of course, can be cut to the width desired.

The method of this invention will vary in accordance with the size of the tire and the size of the injury. The width of the strips depend on the size of the cavity.

The first two strips will have a width approximately that of the cavity at its smallest diameter. The last group of the two strips will have a diameter equal to that of the cavity at the inner surface of the tire, or at its greatest diameter. The number of strips will vary in accordance with the thickness of the tire, or its number of ply. Ordinarily, sufficient strips will be used to fill the cavity. Four sets of crossed strips will, for instance, suffice for an 8-ply tire.

Variations and modifications may be effected without departing from the scope of the novel concept of the present invention as set forth in the appended claim.

What is claimed is:

A method of repairing a cavity in a tire casing, said repair comprising the steps of first, skiving out the inner and outer edges of the cavity to an hourglass cross sectional contour, then coating the skived cavity and the inner surface of said tire surrounding said cavity with an adhesive, then placing a first strip of rubber imbedded cord within the inner portion of the cavity, adjacent its smallest diameter thereof, and extending said first strip along the inside surface of the tire to a distance of approximately three inches from either side of the cavity, then adhering a second strip of rubber imbedded cord of equal dimensions as said first strip at right angles to and on said first strip, said first and second strips having a width substantially equal to the smallest diameter of the cavity, then laying a rubber cushioning disc on said pair of crossed strips in said cavity, then adding a sufficient number of crossed strips of rubber imbedded cord and cushioning discs to substantially fill the inner portion of said cavity, each succeeding pair of crossed strips having equal length and each succeeding pair of said crossed strips and said cushioning discs having progressively increasing width corresponding to the increasing diameter of said inner portion of said cavity, each said succeeding pair of crossed strips being symmetrically rotated with respect to another pair of crossed strips, then covering said repair with a rubber disc having a diameter larger than the length of said pairs of crossed strips, then filling the outer portion of said cavity with a rubber filling and finally vulcanizing the outer and inner sides of said repair simultaneously.

References Cited by the Examiner

UNITED STATES PATENTS

| | | | |
|---|---|---|---|
| 1,591,817 | 7/1926 | Hawkinson | 156—97 |
| 1,899,676 | 2/1933 | Dettling | 156—98 |

FOREIGN PATENTS

| | | |
|---|---|---|
| 474,198 | 6/1951 | Canada. |
| 944,307 | 11/1948 | France. |

OTHER REFERENCES

"Firestone Retread Shop Manual," Firestone Rubber Co., Akron, Ohio, loose leaf sheets: F-4, dated April 10, 1946; F-5, dated Jan. 7, 1954; F-8, dated Dec. 31, 1947; F-9, 10, dated Oct. 1, 1949; F-11, dated Aug. 15, 1945; and M-4, dated Feb. 15, 1954.

HAROLD ANSHER, *Primary Examiner.*

EARL M. BERGERT, *Examiner.*

C. B. COSBY, *Assistant Examiner.*